United States Patent

[11] 3,583,248

| [72] | Inventor | Peter Langenberg<br>Quebec, Canada |
|---|---|---|
| [21] | Appl. No. | 820,350 |
| [22] | Filed | Apr. 23, 1969 |
| [45] | Patented | June 8, 1971 |
| [73] | Assignee | Abex Industries of Canada Ltd.<br>Quebec, Canada |

[54] ACTUATOR WITH NO-BACK MECHANISM
19 Claims, 4 Drawing Figs.

[52] U.S. Cl. .................................................. 74/89.15,
74/424.8
[51] Int. Cl. ....................................................F16h 27/02;
F16h 1/18
[50] Field of Search .......................................... 74/57,
89.15, 424.8

[56] References Cited
UNITED STATES PATENTS

| 2,688,232 | 9/1954 | Geyer | 74/89.15 |
| 2,874,579 | 2/1959 | Geyer | 74/57 |
| 3,269,199 | 8/1966 | Deehan et al. | 74/89.15 |
| 3,195,366 | 7/1965 | Smith | 74/424.8 |
| 3,424,058 | 1/1969 | Wolfe | 74/89.15 |
| 3,449,978 | 6/1969 | Stimpson | 74/89.15 |

*Primary Examiner*—Fred C. Mattern, Jr.
*Assistant Examiner*—Wesley S. Ratliff, Jr.
*Attorney*—Wood, Herron and Evans ABSTRACT: A no-back braking device for use in a linear actuator of the type containing a low-friction lead screw and nut. Right and left hand unidirectional roller clutches are positioned within the main housing enclosing the screw. The first uni-directional roller clutch permits rotation in one direction while resisting it in the other. The roller clutch of the opposite hand permits and resists rotation in respectively opposite directions. An annular flange of the ball screw juxtaposes annular members carrying the unidirectional roller clutches such that any force on the nut either in tension or compression will cause the flange of the screw to make frictional contact with either the right or left hand unidirectional roller clutch to resist rotation in either direction.

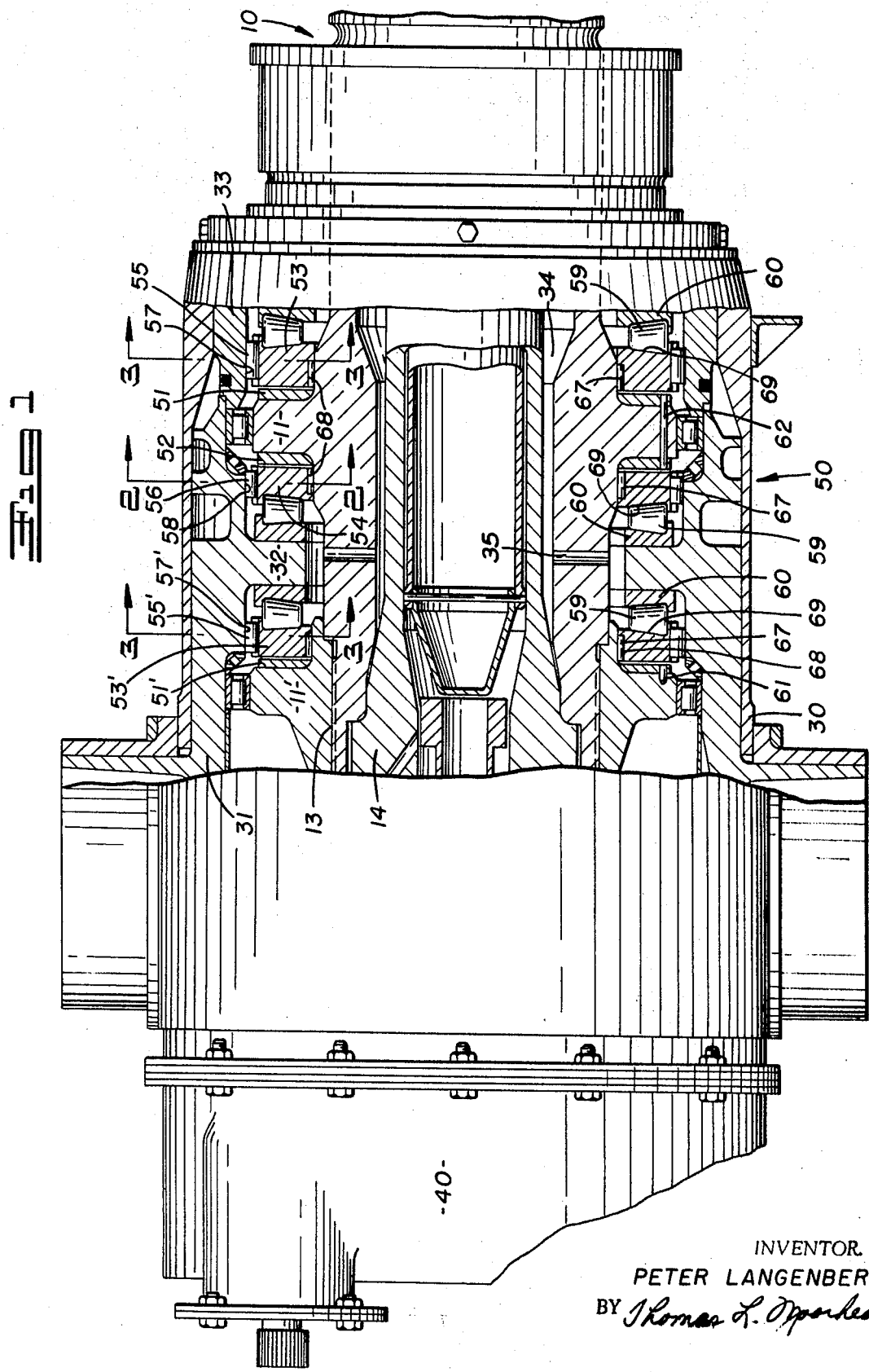

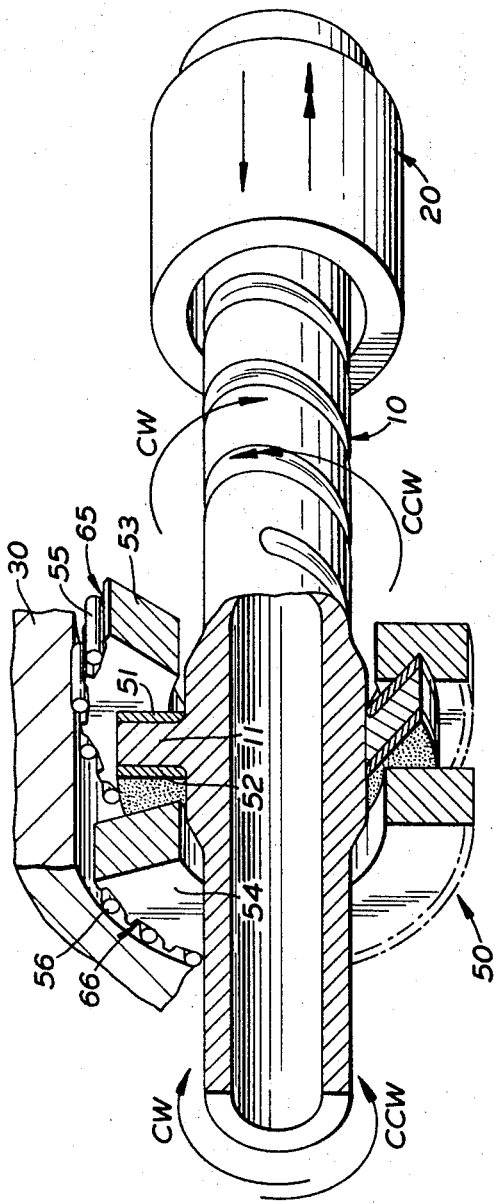
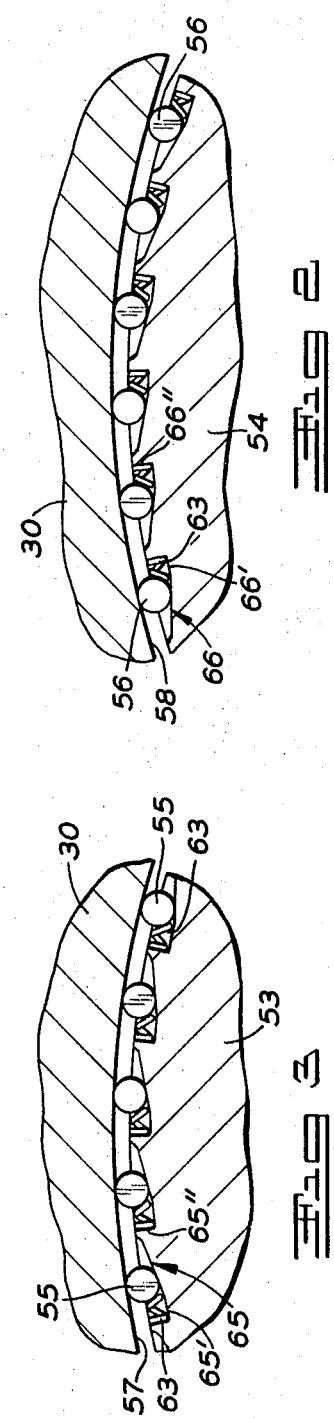
INVENTOR
PETER LANGENBERG
BY Thomas L. Moorhead
ATTORNEY

ACTUATOR WITH NO-BACK MECHANISM

BACKGROUND OF THE INVENTION

The present invention relates to actuators and more particularly to actuators of the low friction lead screw and nut type incorporating a no-back braking device.

In the conventional lead screw actuator the lead screw is mounted to rotate about its longitudinal axis in a stationary member attached to a fixed body. The linear output is derived from a nut which engages the screw and which is moved or translated along the axis of the screw inwardly or outwardly depending on the direction of rotation of the screw. The device also includes a means for turning the screw through the application of an input torque. It is also standard practice to rotate the nut in an axially fixed position and translate the screw along its axis. Therefore the invention is discussed in terms of that application.

In accordance with the invention a means called a no-back device is provided for locking the screw against any induced rotation by reason of an axial loading in tension or compression on the nut. These no-back devices as such are known and have a variety of forms. Examples of such devices are illustrated in U.S. Pat. Nos. 2,874,579 and 3,269,199. But these known devices have many disadvantages. They have added weight to the actuator and have required an increase in the size of the housing, and since weight and size are two of the parameters most important to aircraft design, such disadvantages cannot be accepted. The known devices have also been expensive and have fallen short of the necessary standards of reliability.

Summary of the Invention

The subject of this invention is an actuator comprising a low-friction lead screw driving a corresponding nut whereby an axial motion of the nut is effected by a rotation of the screw, and the actuator also includes a no-back braking device comprising an annular flange on the screw juxtaposing left- and right-handed overrunning clutch assemblies whereby any force on the nut either in tension or compression will cause the flange of the screw to make frictional contact with either the right-or left-hand overrunning clutch assembly to resist rotation in either direction.

The no-back braking device provides the actuator the capability of holding a tensile or compressive load without depending on any restraint from the input, under any combination of operating loads and conditions that the actuator will encounter. This braking device eliminates the effect of an opposing torque by locking the no-back braking device and transferring the torque to the supporting housing. Therefore when the actuator is working against the load, for example when sweeping the wings of a variable wing sweep aircraft aft, the friction faces are not moving relative to each other, the input torque is applied at a controlled rate, and the high efficiency of the ball screw is not sacrificed.

When the actuator is working with the load, for example when sweeping the wings forward, the no-back braking device locks both the input and the induced aiding torques, forcing the friction faces to rotate relative to each other such that energy is absorbed in the brakes and dissipated as heat. The coefficient of friction between the members making frictional contact is carefully calculated such that all of the energy of the aiding torque is dissipated as heat and the actuator maintains its high efficiency.

The overrunning clutches are light in weight, inexpensive and require little additional envelope to house them. Because a large number of rollers can be conveniently utilized around a minimum circumference, the roller type of overrunning clutch is employed, giving the no-back braking device an inherent high reliability. Such an actuator is therefore ideally suited for aerospace applications.

The further advantages of the present invention will be apparent from the following detailed description, reference being made to the accompanying drawings wherein a preferred embodiment of the invention is shown.

In the drawings:

FIG. 1 is an elevational view with a partial axial section of a preferred form of the actuator including the invention;

FIG. 2 is a transverse section taken on line 2-2 of FIG. 1 and shows a unidirectional clutch permitting relative rotation of the cammed member in a left-hand or counterclockwise direction;

FIG. 3 is a transverse section taken on line 3-3 of FIG. 1 and shows a unidirectional clutch permitting relative rotation of the cammed member in a right-hand or clockwise direction;

FIG. 4 is a diagram showing schematically the operation of only a portion of the no-back braking device in a linear actuator.

General Structure

In this invention, in FIGS. 1 and 4, there is illustrated a ball screw actuator incorporating a novel no-back braking device.

The main elements of the actuator are a conventional low-friction ball bearing lead screw 10 with a corresponding nut 20 which are used, for example, to extend or retract the wings of a variable wing sweep aircraft. The housing 30, which includes housing elements 31, 32 and 33, is attached to the fixed inboard portion of the aircraft and the nut is attached at the movable outboard wing. These attachments are not illustrated. A gearbox 40 is incorporated in the inboard end of the actuator, and provides the drive torque to the ball screw 10.

The ball nut 20 comprises the ball track, ball return tubes, automatic lubricator and dog stops which are conventional in the art and therefore are not illustrated.

The screw is dualized by incorporating an internal coaxial torsion-tension tube 14 which is capable of carrying the ultimate load should a crack develop in the screw 10. This torsion-tension tube is splined to the screw at the outboard end, and the torque drive from the actuator gearbox 40 is a splined connection to both the screw 10 and the torsion-tension tube 14 at the inboard end.

The screw 10 includes two flanges 11 and 11'. One of these flanges 11 is integral with the screw and the other flange 11' is attached to the screw by a thread and spline arrangement 13.

The no-back braking device is designated at 50. To both faces of flange 11 have been attached friction discs 51 and 52 by attachment means 62 such as by riveting. Adjacent to each friction disc 51 and 52 are annular members 53 and 54, respectively. The radially inner surface 68 of annular members 53 and 54 provide a race for bearings 67. The lateral surface 69 of each annular member contains an annular groove to mate with thrust bearings 59 and provide the bearing race therefor. Flange 11' is mounted in a manner similar to the structure surrounding flange 11 but with only a single friction disc 51' attached to its outboard side adjacent to annular member 53'. The second flange 11' absorbs load just as does flange 11, but is provided with only a single path for transfer of the load, that is, through 51', 53', 59, 60, 32, because in an aircraft application of this type the tensile loads are much greater than the compressive loads.

For proper function of the device, the coefficient of friction between the friction discs and the adjacent annular members is calculated as a function of the lead of the screw 10. This will be explained more in detail later in regard to the operation of the device in the operating mode.

The radially outer surfaces of annular members 53 and 54 contain a plurality of regularly spaced ramplike indentations or camming depressions 65 and 66. See FIGS. 2 and 3. The shape of the camming depression may be varied but in this mode each camming depression slopes gradually radially inwardly to the deepest portions 65' and 66' and then sharply returns radially outwardly to the surface of the annular member, forming vertical wall portions 65'' and 66''. The outer surfaces of annular members 53, 53' and 54 are identical except for the orientation of the camming depressions. As seen in FIGS. 2 and 3, cam 65 of annulus 53 runs from the shallow portion to the deepest portion 65' in a counterclockwise direction, as viewed from the inboard end of the actuator, while cam 66 of annulus 54 runs from shallow portion to the deepest portion in the opposite, or clockwise, direction. Annulus 53' is similar to annulus 53.

In each camming depression 65 of annulus 53 are seated roller bearings 55. The bearings 55 are mounted such that they can bear against the inside surface 57, or 57' of the housing. Springs 63 rest between the vertical walls 65" and bearings 55 and tend to keep the roller bearings in contact with surface 57, or 57', and the cam 65. Likewise in each cam 66 of annulus 54 are similar roller bearings 56 with springs 63 which urge bearings 56 into contact with surface 58 of the housing and camming depression 66.

As noted, heat is generated at the friction discs 51 and 52 when the wings are being swept forward. An oil flow is maintained across the discs 53, 53' and 54 to ensure that this heat is passed outboard along the screw so that the entire mass of the actuator is used as a heat sink. An oil impeller, not shown, is driven from the actuator gearbox 40. This pump forces oil between the screw 10 and torsion-tension tube 14 to oil reservoir 34. Oil flow holes 35 are provided to connect the oil circuit and promote an adequate flow of oil.

No-Back Operation

The operation of the no-back device 50 will first be explained without regard to loading conditions or modes of operation.

There is a slight clearance, e.g. 0.002 inch, between friction discs 51, 52 and 51' and the adjacent annular members 53, 54 and 53' respectively. A compressive force applied to screw 10 by nut 20 will displace screw 10 slightly inboard. Flanges 11 and 11' are consequently displaced to the left such that friction disc 52 bears against annular member 54 and friction discs 51 and 51' separate farther from annular members 53 and 53'. A tensile force on screw 10 has the opposite effect. Flanges 11 and 11' are displaced slightly to the right bringing friction discs 51 and 51' into contact with annular members 53 and 53' while friction disc 52 separates farther from annular member 54.

While discs 51, 52 and 51' are not in contact with the adjacent annular member, the no-back braking device does not function. Therefore, if there is no compressive or tensile force on the nut being transferred to the screw, the no-back does not operate and it does not need to operate.

When a friction disc is made to contact the adjacent annular member by the application of a tensile or compressive axial loading on nut 20, the overrunning roller clutch is brought into operation. Annular member 54 is left-handed, that is, free to rotate in a counterclockwise direction, and precludes rotation in a clockwise direction. See FIG. 2. If annulus 54 is rotated counterclockwise, roller bearing 56 rolls into the deeper portion 66' of camming depression 66, compressing springs 63. Annulus 54 is therefore free to rotate. But if annulus 54 is rotated clockwise, roller bearing 56 becomes wedged between surface 58 and the shallow portion of camming depression 66 and resists rotation. Annular members 53 and 53' are right-handed and correspondingly are free to rotate in only a clockwise direction. See FIG. 3.

The no-back braking device of this invention must function under two different conditions. In a static or holding mode of operation there is no input torque applied to the actuator and the no-back device 50 must act as a brake against any rotation of the screw caused by a load on the nut in tension or compression. However, in the dynamic or operating mode of operation there is an input to the actuator. In the operating mode the no-back braking device must resist any forces on the nut tending to oppose or aid the normal rotation of the screw in order that the actuator can continue to function at a controlled, uniform rate.

Holding Mode

The operation of the no-back device 50 in the holding mode is explained by reference to FIG. 4 which illustrates a typical right-hand ball screw. Assuming a load is applied to the nut 20, there will first be a tendency for the friction disc or discs to make contact with the adjacent annular member and second, for the ball screw 10 to rotate. Upon the application of a compressive load to the nut 20 (illustrated by single headed arrows) there is a torque acting which attempts to rotate the screw 10 clockwise. Flange 11 is displaced to bring friction disc 52 into contact with annular member 54 which resists clockwise rotation. Therefore a braking action is effected and the torque caused by the load is transferred to the housing rather than to the input.

For the right-hand screw thread and a tensile load (illustrated by double-headed arrows) there is a torque acting which attempts to rotate the screw 10 counterclockwise. In this case friction discs 51 and 51' of flanges 11 and 11' are brought into contact with annular members 53 and 53' which resist clockwise rotation. Again a braking action is effected and the torque caused by the applied tensile load is again transferred to the housing rather than to the input.

Operating Mode

The role of the no-back device in the operating mode is to eliminate the effect of any forces aiding or opposing the input torque which is applied to the screw. Were the opposing load permitted to act against the input torque, a greater input torque would be required, necessitating a larger, heavier input motor. On the other hand, an aiding torque affecting the input torque would supply energy, but makes it difficult to control the speed and hold the position of the device.

The operating mode can best be illustrated with reference to FIG. 4. Compressive and tensile forces are again illustrated by single- and double-headed arrows, respectively.

Torque delivered to screw 10 by input 40 will either be opposed or aided by a loading force on nut 20. A clockwise input torque, illustrated by arrow CW, delivered to screw 10, will be aided by a compressive force and opposed by a tensile force on nut 20. A counterclockwise torque, arrow CW, delivered to screw 10, will be aided by a compressive force and opposed by a tensile force on nut 20. A counterclockwise torque, arrow CCW, delivered to screw 10 will be aided by a tensile force and opposed by a compressive force.

The specifications for the elements of the device are selected in accordance with the following equation:

$$A_1 R_m \mu \geq \frac{A_1 L}{2\pi}$$

or $$\mu R_m 2\pi \geq L,$$

where $A_1$ is the aiding load in pounds, $R_m$ is the mean radius of the friction disc, $\mu$ is the minimum coefficient of friction between the friction disc and the adjacent annular member, and $L$ is the lead of the screw.

A minimum radius is selected for $R_m$ in order to keep the housing size as small as possible. Therefore the screw lead is dictated by this equation and $\mu$ is determined such that all of the energy of the aiding torque is dissipated in heat at the friction disc.

When the input is clockwise (CW), and a tensile load is applied to nut 20, screw 10 with flanges 11 and 11' is shifted slightly outboard, or to the right. Friction discs 51 and 51' contact and provide an opposing, counterclockwise torque to the adjacent annular members 53 and 53'. However, annular members 53 and 53', being right-handed, act to preclude a counterclockwise rotation by the jamming of rollers 55 in the camming depression 65, and the opposing torque is transferred to the housing 30. Therefore the screw is free to be rotated clockwise by the input torque but cannot be rotated counterclockwise by the opposing torque. In a similar manner, where the input is counterclockwise and a compressive load is applied to nut 20, an opposing torque is transferred to the housing 30 through annular member 54.

When the input is clockwise (CW) and a compressive load is applied to nut 20, screw 10 with flanges 11 and 11' is shifted slightly inboard, or to the left. Friction disc 52 contacts and provides an aiding, clockwise torque to the adjacent annular member 54. Since annulus 54 is left-handed it will "jam up" or resist clockwise rotation. This resistance will be applied to the rotation caused by the compressive load and to that caused by the input torque. For the input torque CW to turn the screw 10 the force of the friction between friction disc 52 and annulus 54 is overcome by the input torque and heat from the friction is created. This heat is carried away by the oil in reservoir 34 which circulates in the structure.

While I have described the invention herein in terms of a preferred embodiment, those skilled in the art will recognize that the invention can be employed in other specific structures, within the scope and spirit of the following claims.

What I claim is:

1. In an actuator, a first member having longitudinal screw threads and a second member having corresponding longitudinal screw threads with the members positioned such that a rotation of one member effects an axial longitudinal translation of the other, and a no-back braking device comprising an annular flange means attached to the rotated one of said two members an annular member positioned adjacent to but normally longitudinally spaced from the flange means, said flange means being longitudinally movable into and out of engagement with said annular member, wall means encircling the annular member, and unidirectional braking means positioned between the annular member and the wall means to permit relative rotation in one direction but prevent it in the other, the unidirectional braking means comprising an overrunning clutch, and means operable upon longitudinal displacement of said flange means relative to said annular member to effect engagement of said flange means and said annular member so as to drivingly interconnect said unidirectional braking means with said rotated member.

2. In an actuator, as described in claim 1, wherein the overrunning clutch is a roller clutch.

3. In an actuator, as described in claim 2, wherein the roller clutch comprises a plurality of ramplike indentations in an outer surface of the annular member, roller means in each indentation, and means urging each roller means to wedge between the ramplike indentation and the wall means.

4. In an actuator, as described in claim 2, wherein the roller clutch comprises a plurality of ramplike indentations in an inner surface of the wall means, roller means in each indentation, and means urging each roller means to wedge between the ramplike indentation and a radially outer surface of the annular member.

5. In an actuator, as described in claim 1, wherein an annular friction disc is attached to the flange means adjacent to the annular member.

6. The actuator of claim 5, wherein the coefficient of friction $\mu$ between the friction disc and the adjacent annular member is equal to or greater than the lead L of the screw threads divided by ($R_m$ the mean radius of the friction disc times $2\pi$) or, expressed in formula form, the coefficient of friction $$\mu \geq \frac{L}{R_m 2\pi}$$

7. In an actuator, as defined in claim 2, wherein the no-back braking device comprises a plurality of annular flange means.

8. In an actuator comprising a lead screw means and a corresponding nut means wherein an axial motion of the nut is effected by a rotation of the screw, and a no-back brake means comprising an annular flange means attached to the screw and having front and rear surfaces, a first unidirectional braking means cooperating with the front surface of the flange means to resist rotation of the screw means in one direction, and a second unidirectional braking means cooperating with the rear surface of the flange means to resist rotation of the screw means in the opposite direction, the improvement wherein: the unidirectional braking means comprise, respectively, first and second friction discs connected to the front and rear surfaces of the flange means, first and second freely rotating annular members adjacent to each friction disc housing means surrounding the annular members, and left- and right-handed roller clutch means, respectively, mounted between each annular member and the surrounding housing.

9. In an actuator, as described in claim 8, wherein the roller clutch means comprise a plurality of indented ramps in a radially outer surface of each annular member, roller means in each indented ramp, and means urging each roller means to wedge between the ramp and the surrounding housing.

10. In an actuator, as described in claim 8, wherein the roller clutch means comprises a plurality of indented ramps in a radially inner surface of the surrounding housing, roller means in each indented ramp, and means urging each roller means to wedge between the ramp and a radially outer surface of each annular member.

11. In an actuator, as described in claim 9, wherein the means urging each roller means comprise spring means.

12. In an actuator, as described in claim 10, wherein the means urging each roller means, comprise spring means.

13. A linear actuator comprising:
   housing means,
   a low-friction lead screw within the housing means,
   a corresponding nut attached to a part to be actuated, and cooperating with the screw such that a rotary motion of the screw causes an axial movement of the nut,
   a no-back braking means comprising:
      an annular flange on the screw,
      first and second friction discs on the opposite surfaces of the flange,
      first and second annular members having radially outer surfaces and being rotatably positioned within the housing means adjacent to the friction discs,
      a plurality of camming depressions sloping radially inwardly from the radially outer surface of the first annular member in a clockwise direction, and a plurality of camming depressions sloping radially inwardly from the radially outer surface of the second annular member in a counterclockwise direction,
      roller means in the depressions between the annular members and the housing,
      means associated with each roller means to urge each roller means to wedge between the housing means and the camming depression, whereby the first annular member resists rotation in one direction but permits it in the other, and the second annular member resists and permits relative rotation in respectively different directions than the first annular member.

14. A linear actuator, as described in claim 13, wherein the means associated with each roller means comprise spring means.

15. A linear actuator, as described in claim 13, wherein the friction discs and their respective adjacent annular member are not in contact.

16. An actuator comprising a screw member having external longitudinal screw threads and a nut member having corresponding longitudinal screw threads with the members positioned such that rotation of one member effects an axial longitudinal displacement of the other and a no-back braking device comprising a peripheral radial flange attached to the screw, an annular member surrounding said screw and having one radial face positioned adjacent to a radial face of the flange of said screw, said screw being longitudinally movable relative to said annular member so as to move said radial face of said flange into and out of engagement with said radial face of said annular member, wall means encircling the annular member, and unidirectional braking means positioned between the annular member and the wall means to permit rotation of the annular member in one direction but prevent it in the other, and means operable upon longitudinal displacement of said screw in one direction to effect rotational driving engagement of said radial face of said flange and said radial face of said annular member so as to interconnect said unidirectional braking means with said screw member.

17. The actuator of claim 16, wherein the unidirectional braking means comprises a plurality of ramplike indentations in an outer surface of the annular member, a plurality of roller means, and means urging each roller means to wedge between the ramplike indentations, and the wall means.

18. The actuator of claim 16, wherein a friction disc is fixedly attached to said radial face of said flange and said radial face of said annular member.

19. The actuator of claim 18, wherein the coefficient of friction $\mu$ between the friction disc and the annular member is equal to or greater than the lead $L$ of the screw threads divided by ($R_m$ the means radius of the friction disc times $2\pi$) or, expressed in formula form, the coefficient of friction $$\mu \geq \frac{L}{P_m 2\pi}$$

PO-1050
(5/69)

UNITED STATES PATENT OFFICE
CERTIFICATE OF CORRECTION

Patent No. 3,583,248    Dated June 8, 1971

Inventor(s) Peter Langenberg

It is certified that error appears in the above-identified patent and that said Letters Patent are hereby corrected as shown below:

Column 4, lines 39, 40, and 41, delete the entire sentence, "A counterclockwise torque, arrow CW, delivered to screw 10, will be aided by a compressive force and opposed by a tensile force on nut 20."

Signed and sealed this 26th day of October 1971.

(SEAL)
Attest:

EDWARD M. FLETCHER, JR.        ROBERT GOTTSCHALK
Attesting Officer              Acting Commissioner of Patents